Feb. 6, 1962 R. H. COLLEY 3,019,599
AIRCRAFT REACTION-PROPULSION UNITS OR INSTALLATIONS
Filed Jan. 11, 1960
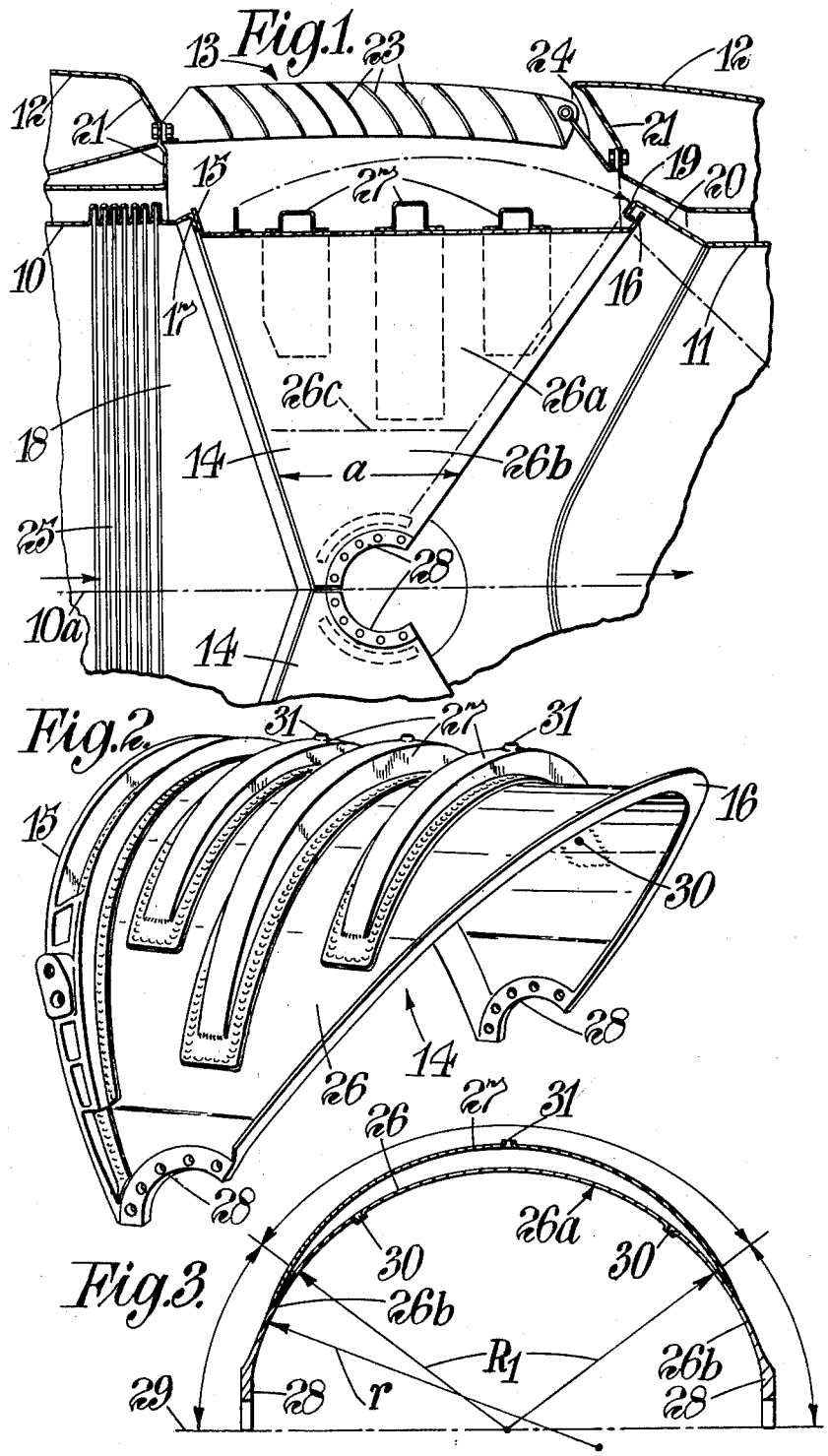

3,019,599
AIRCRAFT REACTION-PROPULSION UNITS
OR INSTALLATIONS
Rowan Herbert Colley, Sunny Hill, Derby, England, assignor to Rolls-Royce Limited, Derby, England, a company of Great Britain
Filed Jan. 11, 1960, Ser. No. 1,672
Claims priority, application Great Britain Jan. 15, 1959
4 Claims. (Cl. 60—35.54)

This invention comprises improvements in or relating to aircraft reaction-propulsion units and installations as claimed in British patent specification No. 745,649 (Rolly-Royce Limited).

In British patent specification No. 745,649 (Rolls-Royce Limited), there is claimed an aircraft reaction-propulsion unit or installation comprising a jet-pipe, a propulsion nozzle at the outlet end of the jet-pipe, porting in the wall of the jet-pipe upstream of the propulsion nozzle leading to auxiliary ducting extending from the porting to an outlet to atmosphere and inclined forwardly to the direction of flight at its outlet end so that gas flowing through the auxiliary ducting produces a braking effect on an aircraft fitted with the unit, and at least one valve member adapted to swing about an axis at right angles to the jet-pipe axis and passing through it and adapted in a first position to close off the passage through said auxiliary ducting and in a second position to block the flow through the jet-pipe to the propulsion nozzle. Furthermore, in British patent specification No. 745,649, (Rolls-Royce Limited), there are described and claimed a number of constructions of reaction-propulsion unit or installation in which the jet-pipe is cylindrical, and whereof each valve member has a basic geometrical form consisting of that portion of the jet-pipe cylinder or of a sphere having its centre on the jet-pipe axis, which lies between two planes intersecting on the swinging axis of the valve member. Thus the valve member is widest at its mid point and tapers in axial dimension at each end towards its swinging axis, and also the principal radius of curvature is the same at each point in the surface of the valve member.

It has been found in practice that, after prolonged use, such a valve member may be distorted over its narrow end portions adjacent the swinging axis due to the intense heating and high loads to which the valve member is subjected. This distortion occurs even if the central portion is stiffened by external ribs and the end portions are made from thicker material than the centre portion. It will be realised that stiffening ribs cannot be extended to the ends of the valve member owing to the lack of space adjacent its pivotal mountings.

This invention has for an object to provide a form of such valve member in which distortion is markedly reduced.

According to the present invention, in jet propulsion means comprising a jet pipe, a propulsion nozzle at the outlet of the jet pipe, a reverse thrust outlet from the jet upstream of the propulsion nozzle and means receiving gas passing through the reverse thrust outlet to impart a forward component of velocity to said gas thereby to produce a reverse thrust; there is provided at least one valve member curved about the jet pipe axis and mounted within the jet pipe to swing about an axis at right angles to the jet pipe axis between a first position in which the valve member closes the reverse thrust outlet and permits gas to flow to said propulsion nozzle, and a second position in which the reverse thrust outlet is uncovered and gas flow to the propulsion nozzle is blocked, said valve member having end portions by which it is supported, said end portions tapering in axial dimension ($a$) towards its pivotal axis, and said end portions having a principal radius of curvature ($r$) which increases from the central portion towards the pivotal axis.

It can be shown that the ability of the valve member to withstand loads is dependent on the product $a.r.$ where "$r$" is the principal radius of curvature at any point and "$a$" is the axial dimension of the valve member measured through that point. Thus with the form of valve member shown in British patent specification No. 745,649 (Rolls-Royce Limited), the product $a.r.$ decreases towards the pivotal axis.

Preferably, it is arranged that over the end portions the product $a.r.$ remains substantially constant.

The central portion of the valve member may be unmodified as compared with valve members as shown in British patent specification No. 745,649 (Rolls-Royce Limited) since the central portion can be suitably stiffened by external circumferentially-extending ribs.

According to a preferred feature of this invention, such an external stiffening rib is hollow, has its interior in communication with the interior of the valve member through a hole in the valve member adjacent each end of the rib, and has a hole at its mid length to the exterior of the valve member. Such an arrangement results in a flow of hot gas through the stiffening rib so that the valve member and rib acquire a more uniform temperature in use and distortion due to differential expansion is reduced.

One construction according to this invention will now be described with reference to the accompanying drawings, in which—

FIGURE 1 is a diagrammatic axial section through a part of a reaction-propulsion unit or installation, FIGURE 2 is a perspective view of a valve member, and FIGURE 3 is a diagrammatic section through the valve member, the plane of section containing the swinging axis of the member.

The reaction-propulsion unit or installation (FIGURE 1) comprises a cylindrical jet-pipe having an upstream portion 10 and a downstream portion 11 which leads to the normal propulsion nozzle (not shown). The unit or installation further comprises a fairing 12 externally of the jet pipe, the fairing being provided with outlets 13 in the region of the adjacent ends of the jet-pipe portions 10, 11.

Between the adjacent ends of the jet-pipe portions 10, 11 there are provided a pair of valve members 14 which are mounted to swing about an axis at right angles to and intersecting the jet-pipe axis 10a between a full line, or first, position and a chain line, or second position. In the first position, the valve members 14 co-operate through flanges 15, 16 with a flange 17 on a downstream extension 18 of the upstream jet-pipe portion 10 and with a flange 19 on a spherical upstream extension 20 of the downstream jet-pipe portion 11 to close porting defined between the parts 18, 20 and thereby to prevent exhaust gas flowing outwardly through ducting 21 towards the outlet 13 and to permit exhaust to flow to the normal propulsion nozzle. In the second position, the valve members 14 block the flow of exhaust gas into the downstream jet-pipe portion so that the exhaust gas is constrained to flow into the ducting 21 and thus to the outlet 13. The walls of the ducting 21 are inclined forwardly so that the exhaust gases enter atmosphere with a forward component of velocity and there is also provided in the ducting 21 a series of vanes 23 which assist to impart such velocity component to the exhaust gases.

The vanes 23 may be in a unit as set forth in British patent specification No. 10323/58 (Rolls-Royce Limited) or in British patent specification No. 10935/58, (Rolls-Royce Limited), the unit being secured to the forward wall of ducting 21 and connected by links 24 to the rearward wall of the ducting.

The upstream jet-pipe portion 10 and its extension 18 are connected together through a bellows 25.

Each valve member 14 comprises (FIGURES 2 and 3) a main wall 26 carrying the flanges 15, 16 which have their sealing surfaces in mutually inclined planes, the flange 16 being in a plane containing the pivotal axis of the valve member. The wall 26 is stiffened by circumferentially-extending top-hat section stiffener ribs 27 the ends of which are spaced from end fittings 28 by which the valve member is connected to its supporting bearing, the axis of which is indicated at 29.

It will be seen that the valve member 14 tapers in axial dimension "$a$" (FIGURE 1) towards the end fittings and in order to give the valve member an improved ability to withstand the loads to which it is subjected, the main wall 26 is shaped so as to have a central portion 26a which is of circular arc section on planes normal to the jet pipe axis 10a, so that over this portion the principal radius of curvature is uniform, and is also shaped so that the end portions 26b increase progressively in principal radius of curvature from the central portion to the fittings 28. In FIGURE 3, the limits of the central portion 26a are indicated by radii $R_1$ and the greater radius of curvature at a point in one of the end portions 26b is indicated by radius "$r$". It is preferably arranged that the product $a.r.$ is substantially constant. The junction between an end portion 26b and the central portion 26a is indicated in FIGURE 1 to chain line 26c.

In one construction for use with a 24 inch diameter jet pipe, the central portion 26a of the valve member subtends an angle of about 50° at its centre of curvature, and the radius of curvature of the end portions 26b increases progressively from 12 inches at the junctions with the central portion to about 24 inches at the fittings 28.

In order to reduce relative expansion between the main wall 26 and the ribs 27, each rib has associated with it a pair of holes 30 in the main wall 26 to place the interior of the rib in communication with the interior of the valve member 14, the holes 30 being positioned one adjacent each end of the rib, and the rib 27 is formed at its mid length with a single hole 31. This allows a small flow of gas through the rib so that it tends to acquire the same temperature as the wall 26. In an arrangement having the above dimensions, the holes 30 may be ½ inch diameter and the hole 31 may be of ⅛ inch diameter.

I claim:

1. In jet propulsion means comprising a jet pipe, a propulsion nozzle at the outlet of the jet pipe, a lateral reverse thrust outlet from the jet pipe upstream of the propulsion nozzle and means receiving gas passing through the reverse thrust outlet and imparting a forward component of velocity to said gas thereby to produce a reverse thrust; at least one valve member curved transversely about the jet pipe axis and mounted within the jet pipe to swing about an axis at right angles to the jet pipe axis between a first position in which the valve member closes the reverse thrust outlet and permits gas to flow to said propulsion nozzle, and a second position in which the reverse thrust outlet is uncovered and gas flow to the propulsion nozzle is blocked, said valve member having end portions by which it is supported, said end portions tapering in axial dimension ($a$) towards its pivotal axis, and said end portions having a principal radius of curvature ($r$) which increases from the central portion towards the pivotal axis such that the product $a.r.$ is substantially constant peripherally along said end portions.

2. In jet propulsion means according to claim 1, said valve member comprising a centre portion between said end portions, said centre portion being stiffened by at least one external circumferentially extending rib which rib is hollow, has its interior in communication with the internal surface of the valve member through holes in the valve member adjacent the ends of the rib and has a hole at its mid length to externally of the valve member.

3. In jet propulsion means comprising a cylindrical jet pipe, a propulsion nozzle at the outlet of the jet pipe, a pair of diametrically-opposite reverse-thrust outlets from the jet upstream of the propulsion nozzle and means receiving gas passing through the reverse thrust outlets to impart a forward component of velocity to said gas thereby to produce a reverse thrust; a pair of valve members, one co-operating with each of said reverse thrust outlets, each valve member being curved about the jet pipe axis and mounted within the jet pipe to swing about an axis at right angles to the jet pipe axis between a first position in which the valve member closes the associated reverse thrust outlet and permits gas to flow to said propulsion nozzle, and a second position in which the associated reverse thrust outlet is uncovered and gas flow to the propulsion nozzle is blocked, each said valve member having end portions by which it is supported, said end portions tapering in axial dimensions ($a$) towards its pivotal axis, and said end portions having a principal radius of curvature ($r$) which increases from the central portion towards the pivotal axis such that the product $a.r.$ is substantially constant peripherally along said end portions.

4. In jet propulsion means according to claim 3, each said valve member comprising a centre portion between said end portions, said centre portion being stiffened by at least one external circumferentially extending rib which rib is hollow, has its interior in communication with the internal surface of the valve member through holes in the valve member adjacent the ends of the rib and has a hole at its mid length to externally of the valve member.

References Cited in the file of this patent:

UNITED STATES PATENTS

| | | |
|---|---|---|
| 2,780,058 | Beale et al. | Feb. 5, 1957 |
| 2,930,186 | Ashwood et al. | Mar. 29, 1960 |

FOREIGN PATENTS

| | | |
|---|---|---|
| 213,206 | Australia | Aug. 22, 1957 |